United States Patent

Maofu et al.

Patent Number: 5,422,040
Date of Patent: Jun. 6, 1995

[54] HIGH PERFORMANCE PHOSPHATE GREEN FLUORESCENT POWDER AND ITS METHOD OF PREPARATION

[75] Inventors: Tong Maofu; Li Bingquan; Jiang Jianping; Zhang Guanmin; Liu Yongli, all of Shanghai, China

[73] Assignee: Shanghai Yue Long Nonferrous Metals Ltd., Shanghai, China

[21] Appl. No.: 245,537

[22] Filed: May 18, 1994

[30] Foreign Application Priority Data

Aug. 6, 1993 [CN] China .................... 93109500

[51] Int. Cl.⁶ .................... C09K 11/70; C09K 11/81
[52] U.S. Cl. .................................. 252/301.4 P
[58] Field of Search ........................ 252/301.48

[56] References Cited

U.S. PATENT DOCUMENTS 4,764,301 8/1988 Awazv et al. ............ 252/301.4 P

FOREIGN PATENT DOCUMENTS 54-58086 5/1979 Japan .
57-23674 2/1982 Japan .
1458700 12/1976 United Kingdom .

OTHER PUBLICATIONS

"Effect of Thorium on Ce$^{+3}$ Phosphors," Mary V. Hoffman, *J. Electrochem, Soc.: Solid State Science*, vol. 118, No. 9, Sep. 1971.
"Phosphors Based on Rare Earth Phosphates," R. C. Ropp, *J. Electrochem, Soc.: Solid State Sciecne*, vol. 115, No. 8, Aug. 1968.
Abstract, *76–Electric Phenomena*, vol. 19, 1979, 91:100982u, Phosphor, no agent.
Abstract appearing in *73–Spectroscopy*, vol. 96, 1982, 96:208178d Green–emitting cerium terbium phosphate phosphor.

*Primary Examiner*—Mark L. Bell
*Assistant Examiner*—C. M. Bonner
*Attorney, Agent, or Firm*—Beveridge, DeGrandi, Weilacher & Young

[57] ABSTRACT

This invention relates to a novel phosphate based green phosphor represented by the formula $(Ln_{1-x-y}Ce_xTb_y)PO_4 \cdot wM$ where Ln refers to one or more than one of La, Gd, Y and M refers to one or more than one oxide of $B_2O_3$, $Al_2O_3$, $In_2O_3$, $ZrO_2$, $Nb_2O_5$ and $TiO_2$. Requisite materials are processed through blending, prefiring, firing and post-firing treatments to form the high performance phosphate based green phosphor. The processing steps of this invention effectively obviate the difficulties as associated with the prior technology, substantially improve the phosphor brightness, thermal stability, enlarge the specific surface of the phosphor, and reduce the phosphor consumption in screen coating, thereby reducing the picture tube manufacturing cost and eventually yielding the novel high performance phosphate based green phosphor.

4 Claims, 3 Drawing Sheets

HIGH PERFORMANCE PHOSPHATE GREEN FLUORESCENT POWDER AND ITS METHOD OF PREPARATION

This invention relates to a novel phosphate based green phosphor and its method of preparation and particularly, it relates to a high performance phosphate based green phosphor and its method of preparation through the introduction of one or more than one oxides of either the boron group elements or the refractory elements.

BACKGROUND

Triphosphor or three primary color phosphor is prepared by blending three color phosphors, including the red phosphor giving the main emission peak at the wavelength of 611 nm, the green phosphor at 544 nm, and the blue phosphor at 450 nm when excited by ultraviolet light of the wavelength of 253.7 nm, the brightness being mainly contributed by the green. In 1976, the Philips Electronics of Netherlands developed the magnesium polyaluminate based green phosphor coactivated by Ce and Tb, making an excellent contribution to the development of triphosphor fluorescent lamps (EP 1458700). However, the very high firing temperature in excess of 1500° C. and prolonged heating as required by such green phosphor resulted in hard caking of the calcined mass that was difficult to undergo post-firing treatment. Low material yield and short service life of the refractories used led to a high production cost. Therefore, active studies and increasing commercial applications are being directed to the phosphate based green phosphor coactivated by Ce and Tb.

Phosphate based green phosphors were reported fairly early. In 1968, R. C. Ropp of Westinghouse Electric Corp. studied phosphors made by using $LaPO_4$, $YPO_4$, and $GdPO_4$ as matrixes and $Eu^{3+}$, $Ce^{3+}$, $Tb^{3+}$, $Sm^{3+}$, $Tm^{3+}$, and $Dy^{3+}$ as activators [J. Electrochem. Soc., 115, 841 (1968)]. In 1971, M. V. Hoffman of General Electric studied a phosphor of composition $(La_{1-x-y} Ce_x Tb_y) PO_4$ [J. Electrochem. Soc., 118, 1508 (1971)]. In 1979, Mitsubishi Electric Corp. of Japan reported a green phosphor of composition $(La_{1-x-y-p-q} Gd_x Y_y Ce_p Tb_q) PO_4$ [JP 54-56086] and 0.15 was considered as the optimized value of p in the composition formula, any further increase in p would bring about a decrease of brightness. All phosphate based green phosphors reported previously suffered from low brightness and could hardly be used in commercial production.

In 1982, Nichia Chemical Industries Ltd of Japan reported on the phosphor of composition $(Ce_{1-x-y} La_x Tb_y) PO_4$ [JP57-23674], where $0.1<(x+y)<0.4$, $0.05<y<0.3$. The phosphor was prepared by the well known dry blending method or the wet precipitation method. In that invention, phosphor brightness was increased by displacing small amount of Ce by La and high firing temperature $>1500°$ C. was also obviated. But the $Ce^{3+}$ concentration in the phosphor was relatively high (1-x-y=0.7 was considered as optimized) and $Ce^{3+}$ had a strong tendency of being oxidized making the phosphor less stable, less durable, easier to decay in brightness and more vulnerable to ultraviolet emission. When dry blending process was used for its preparation, the phosphor was found to agglomerate and stick to the wall since $(NH_4)_2HPO_4$ was hygroscopic. This made it difficult to obtain a homogenous mixture, resulting in local excess or insufficiency of P/RE (phosphorus and rare earth ratio). It was therefore difficult to obtain high performance phosphor. When using the wet precipitation process, the phosphate obtained was small in particle size, making its washing and filtration difficult and resulting in formation of cakes which needs disintegration. Moreover, the particle size distribution of the green phosphor made was rather wide due to the presence of a large amount of fine particles. The quality of the coat film was, therefore, not satisfactory and its luminous efficiency was low.

DETAILED DESCRIPTION

Figure 1:
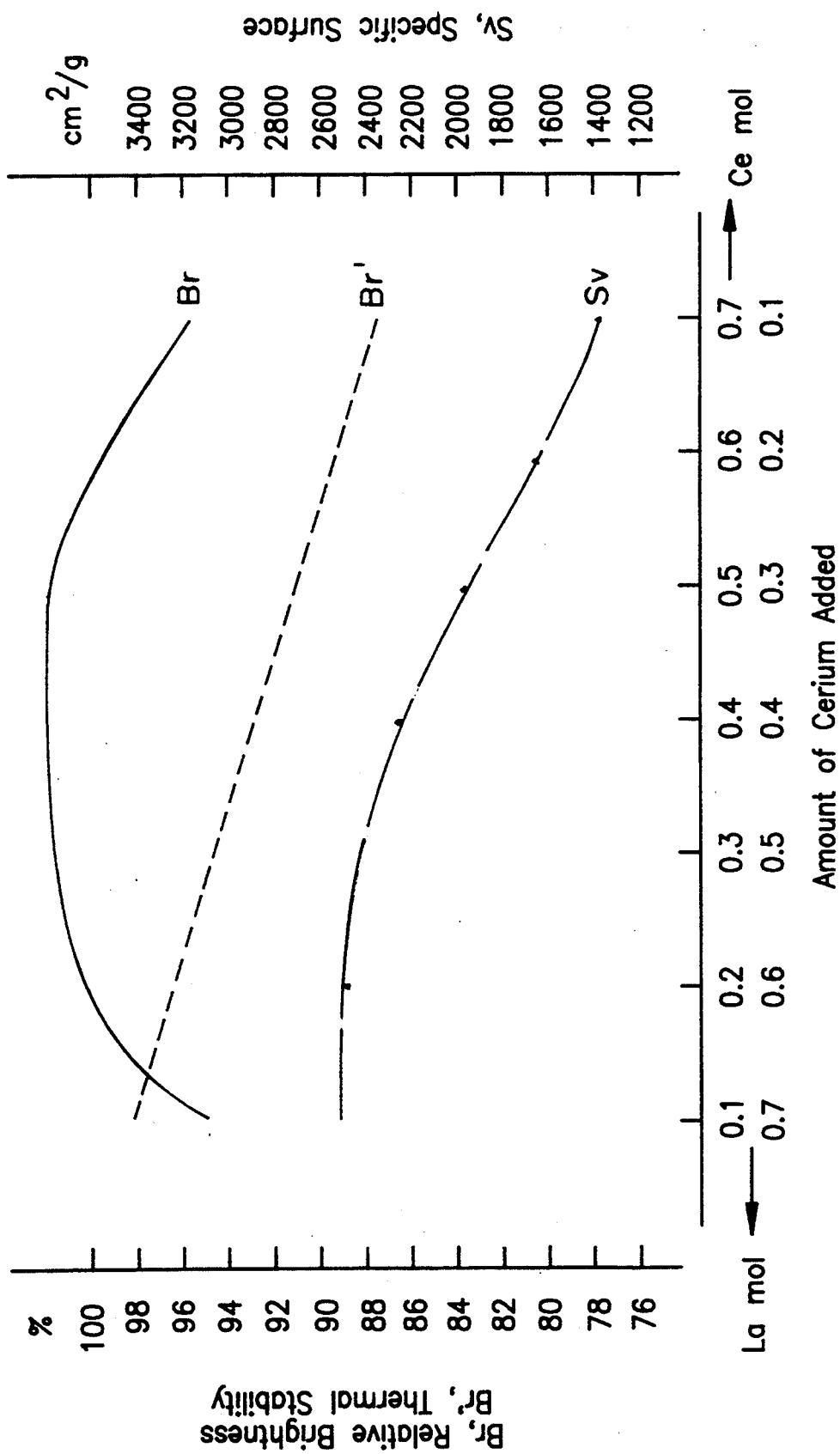
FIG. 1 shows the effects of cerium addition to the rare earth of the phosphor.

This invention aims at offering a novel rare earth phosphate based green phosphor and its method of preparation. The composition of the rare earth phosphate based green phosphor can be represented by $$(Ln_{1-x-y} Ce_x Tb_y) PO_4 \cdot wM$$

where Ln stands for one or more than one of the rare earth elements such as La, Y, and Gd;

M stands for one or more than one of the boron group oxides or refractory oxides such as $B_2O_3$, $Al_2O_3$, $In_2O_3$, $ZrO_2$, $Nb_2O_5$, and $TiO_2$;

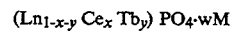

and $0.05 \leq x \leq 0.7$, $0.05 \leq y \leq 0.4$
$1 \times 10^{-2} \leq w \leq 1 \times 10^{-1}$.

The processing steps for the preparation of the rare earth phosphate based green phosphor of this invention are outlined below:

1. Material Preparation $(NH_4)_2 HPO_4$ as bought is first dried at low temperature for 5 hours, the component M of the amount calculated according to the composition formula given above is then added along with an appropriate amount of flux $Li_3 PO_4$. After blending for a few hours, the material obtained is referred to as material A.

$Ln_2O_3$, $CeO_2$, and $Tb_4O_7$ of amounts based on the composition formula above are weighed out, water is added to them to form a slurry, and nitric or hydrochloric acid is added to dissolve the oxides to a final pH of 1-3. The rare earth concentration in the solution should be about 100 g/l of oxides. Then hot oxalic acid solution of concentration not exceeding 10% is added while stirring to form the rare earth oxalate precipitate. The precipitate is thoroughly washed with deionized water, filtered and dried. Firing at 1100° C. for 1-3 hours gives $(Ln_{1-x-y} Ce_x Tb_y)_2O_3$ which is referred to as material B.

2. Blending

Material A and material B in calculated ratio are placed into a V-type blender, in which the mole ratio of phosphate radical in material A to RE in material B is (1-1.2):1 and the amount of flux $Li_3 PO_4$ should be about 0.3% by wt of rare earth phosphate. Blending for more than 5 hours gives the AB mixture.

3. Prefiring

The thoroughly mixed AB mixture are placed into a quartz or alumina crucible and then it is prefired in an oxidizing atmosphere at about 800° C. for 2-3 hours.

After being furnace cooled, the prefired material is discharged.

4. Firing

The prefired material is then crushed, pulverized, sieved with a 100 mesh sieve, repacked into the crucible, and fired at 1100°–1150° C. in a reducing atmosphere of a mixture of 1–5% by vol of hydrogen and 95–99% by vol of nitrogen for 1 to 2 hours. After being furnace cooled to a temperature below 200° C., the fired material is discharged.

5. Post-firing Treatment

The fired material is placed into a ball mill and disintegrated with glass or plastic balls of diameter 2 to 5 mm for 1 to 2 hours, the ratio of feed:water:balls=1:1:1 by wt. After sieving with a 450 mesh sieve, the fine pulp is washed with deionized water 5 times and then filtered. The filter cake is then charged into a drying oven and after drying, it is further sieved with a 100 mesh sieve. After quality inspection, this is the phosphate based green phosphor of this invention.

Compared with prior arts, in the novel rare earth phosphate based green phosphor of this invention, the introduction of one or more than one oxide of boron group elements or refractory elements into rare earth phosphates effectively depresses the oxidation of $Ce^{3+}$ and improves the thermal stability of the phosphor. High brightness and high performance rare earth phosphate based green phosphor is thus obtained. Furthermore, the addition of oxides of boron group elements or refractory elements improves the crystal growth of particles, weakening the tendency of the particles to agglomerate. The specific surface of the phosphor particles is increased and thus the phosphor consumption in screen coating is decreased, thereby the lamp tube manufacturing cost is reduced.

Improvements are also made in this invention over the existing method of phosphor preparation. The $(NH_4)_2 HPO_4$ as bought is previously dried at low temperature before blending with small amounts of additive and flux. The rare earth oxides such as coprecipitated $(La, Ce, Tb)_2O_3$ which may pick up moisture from air are prefired at high temperature, thus eliminating the troubles of agglomeration and sticking to the inner wall of the blender. Such measures are believed to be more rationalized and have been proved by practice to be very effective.

Before going into detailed discussions on the various factors affecting the performance of the green phosphor, it is appropriate to have the terms, relative brightness and thermal stability, well defined below:

The relative brightness of phosphor refers to the ratio of the brightness of the phosphor sample when excited by the ultraviolet emission of 253.7 nm to the brightness of the standard sample under strictly identical excitation conditions.

$$\text{Relative brightness Br\%} = \frac{\text{Sample brightness}}{\text{Standard sample brightness}} \times 100\%$$

The thermal stability of the phosphor refers to the ratio of the brightness of the phosphor sample measured after baking at 600° C. for half an hour and cooling to room temperature to the brightness measured without the baking treatment.

$$\text{Thermal stability Br'\%} = \frac{\text{Brightness measured after 600° C. heating for 0.5 hours}}{\text{Brightness measured without heating}} \times 100\%$$

The accompanying figures will help the elucidation of the functions of Ce, Tb and $PO_4^{31}$ in the rare earth phosphate based green phosphor of this invention.

FIG. 1 shows the effects of cerium addition to the rare earth of the green phosphor on relative brightness, thermal stability, and specific surface of the phosphor. As indicated in this figure, the brightness of the phosphor increases with an increase in Ce addition in the initial stage, but rather slowly when Ce addition exceeds 0.2 atomic ratio and begins to drop down when Ce addition exceeds 0.5 atomic ratio. Both the thermal stability and specific surface decrease as Ce addition increases.

With an increase in Ce content, the energy absorbed upon excitation by 253.7 nm ultraviolet emission increases and, therefore, the relative brightness of the phosphor is improved. But, at the same time, the probability of $Ce^{3+}$ being oxidized to the tetravalent state also increases. This is especially true when the phosphor is strongly heated, thus causing the phosphor to turn grey or brown and its brightness to drop rapidly. In order to prepare phosphor with high brightness, good thermal stability, and large specific surface, the Ce addition in atomic ratio should preferably range from 0.2 to 0.5.

Figure 2:
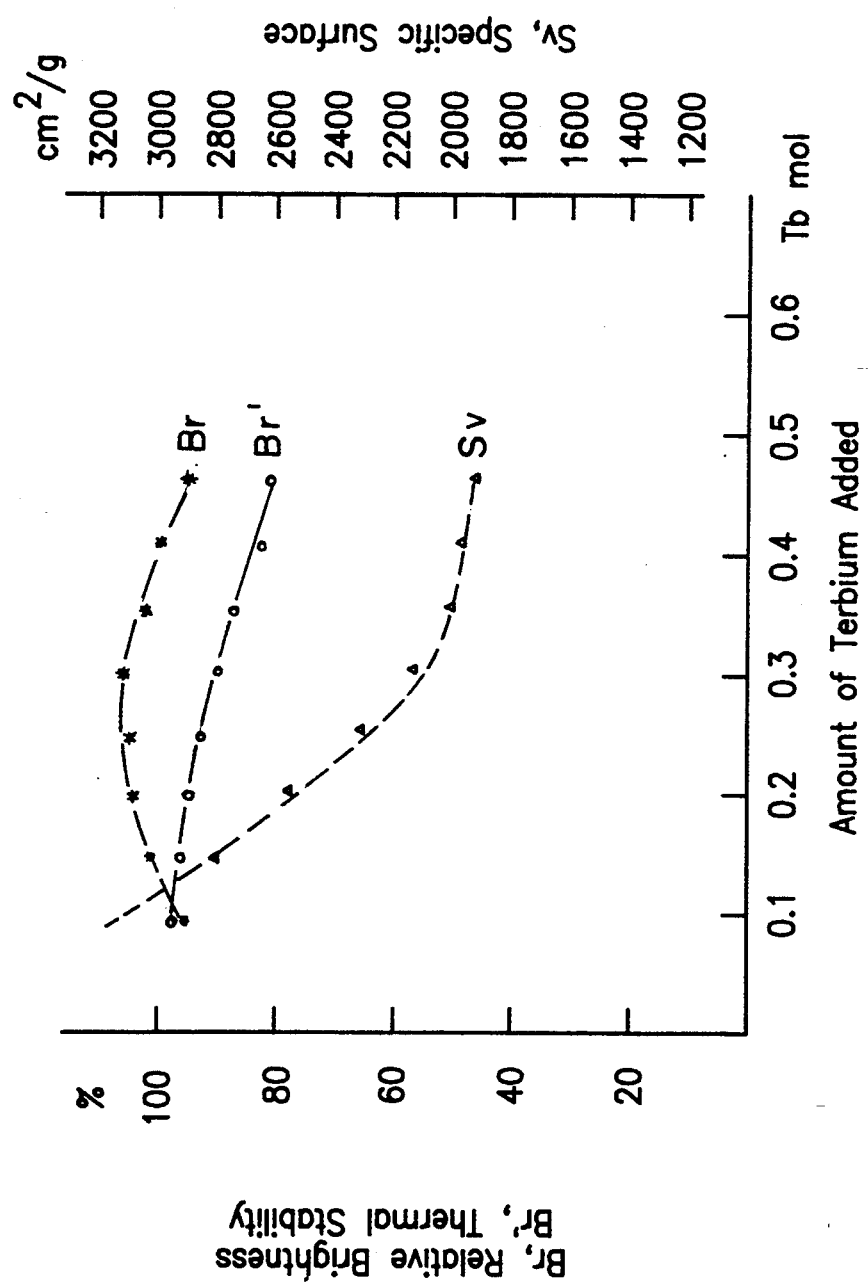
FIG. 2 shows the effects of terbium addition to the rare earth of the phosphor.

FIG. 2 shows the effects of terbium addition to the rare earth of the phosphor on relative brightness, thermal stability and specific surface of the phosphor. As indicated in this figure, the phosphor brightness increases with an increase of Tb addition, but when Tb addition exceeds 0.3 atomic ratio, on the contrary its brightness begins to drop. As is the case with Ce addition, both the thermal stability and specific surface decrease with an increase in Tb addition. The Tb addition in atomic ratio should preferably range from 0.1 to 0.3.

Figure 3:
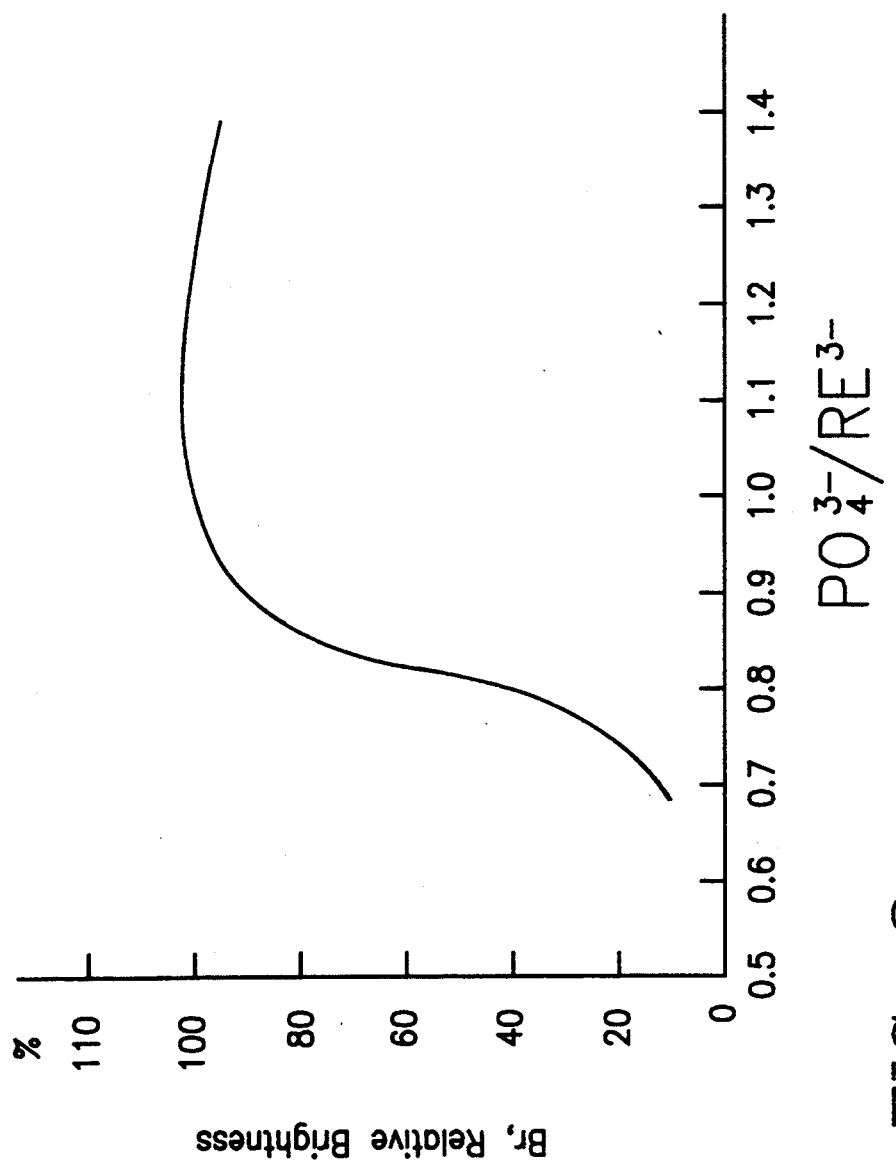
FIG. 3 shows the effect of phosphate to rare earth ratio on relative brightness.

FIG. 3 shows the effect of phosphate to rare earth ratio on the relative brightness of the phosphor. As indicated in this figure, when $PO_4^{3+}/RE^{3+} < 0.8$, the relative brightness of the phosphor is below 50%. It is therefore necessary to provide sufficient phosphate radical to ensure well developed crystal particles. But excessive phosphate radical not only reduces furnace charge, but also brings about some reduction of the phosphor brightness. The phosphate to rare earth mole ratio should preferably be (1–1.2):1.

EXAMPLES

The following examples serve to illustrate the effects on the brightness, thermal stability and specific surface of the rare earth phosphate based green phosphor and the preferable ranges of the various additions.

These examples are given for demonstration only. The scope of protection of this invention will be further embodied in the paragraphs under claims.

EXAMPLE 1

69.30 g of previously dried $(NH_4)_2 HPO_4$, 0.35 g of flux $Li_3 PO_4$, and 0.51 g of $Al_2O_3$ were weighted out and thoroughly blended. This resulted in material A.

According to the requirement that the phosphate radical contained in material A and the rare earth contained in material B should comply with the preferable mole ratio of (1–1.2):1, 40.75 g of $La_2O_3$, 27.52 g of $CeO_2$, and 16.80 g of $Tb_4O_7$ were weighed out, dissolved in conc. HCl or nitric acid of concentration above 60% to a final pH of 1–3, and diluted with deionized water so that the rare earth concentration in the solution was 100 g/l of oxides. The solution was heated to about 60° C. and warm oxalic acid solution of concentration not exceeding 10% was added while starring to form rare earth oxalate precipitate. The precipitate was washed with warm deionized water 5 times and then filtered. The filter cake, after being dried, was charged into a crucible and calcined at 1100° C. for 3 hours. The rare earth oxide $(La_{0.5}Ce_{0.32}Tb_{0.18})_2O_3$ thus obtained formed the material B.

Material A and material B were placed into a blender. After thorough blending for more than 5 hours, the mixture was charged into a crucible, prefired at 800° C. for 2–3 hours, cooled and discharged. The refired material was then crushed, sieved with a 100 mesh sieve, recharged into a quartz or alumina crucible, and fed into the furnace. The furnace was first purged with high purity nitrogen until the air within it was completely displaced, and fed continuously with a mixed gas of 1–5% by volume of hydrogen and 99–95% by volume of nitrogen while heating. When the temperature came up to 1150° C., this temperature was kept for 2 hours. The furnace was then cooled to 400° C., at this moment hydrogen feeding was stopped with the nitrogen gas streaming through the furnace till the temperature was further decreased to 200° C. The fired material was transferred into a ball mill with glass or plastic balls of 2–5 mm in diameter. To the mill was also added deionized water with the ball, charge and water ratio equal to about 1:1:1 by wt. After 2–3 hours ball milling, the pulp was wet sieved through a 450 mesh sieve, washed with deionized water 5 times, filtered, and dried at 120° C. The rare earth phosphate based green phosphor of this invention was thus obtained.

EXAMPLES 2–8

In these examples all samples were prepared in a way identical with Example 1, except that the amount of $Al_2O_3$ added to material A was changed into 0.92 g, 1.33 g, 1.73 g, 2.14 g, 2.55 g, 5.10 g, and 10.20 g respectively.

The values of w in the formula $(La_{0.50}Ce_{0.32}Tb_{0.18})PO_4 \cdot wAl_2O_3$ for Examples 1 to 8 were, therefore, respectively $1\times10^{-2}$, $1.8\times10^{-2}$, $2.6\times10^{-2}$, $3.4\times10^{-2}$, $4.2\times10^{-2}$, $5.0\times10^{-2}$, $1.0\times10^{-1}$, $2\times10^{-1}$.

In the five tables that follow, the results of all the examples (Examples 1–25) are given together with the results of a control sample and a so-called standard sample GP-1. The control sample was prepared in the same way as in Example 1 except that no $Al_2O_3$ was added, its composition can thus be represented by $(Ln_{0.50}Ce_{0.32}Tb_{0.18})PO_4$. The standard sample GP-1 is a Japanese sample of advanced quality in the international market.

Measurement results for Examples 1–8 are tabulated in Table 1.

TABLE 1

| Results of Examples 1 to 8 | | | |
|---|---|---|---|
| Sample No. | Relative Brightness Br(%) | Specific Surface Sv(cm²/g) | Thermal Stability Br'(%) |
| Example 1 | 100.8 | 2400 | 92.5 |
| Example 2 | 101.1 | 2800 | 92.8 |
| Example 3 | 101.9 | 3300 | 95.0 |
| Example 4 | 104.0 | 3400 | 97.0 |
| Example 5 | 104.2 | 3460 | 97.8 |
| Example 6 | 104.4 | 3520 | 99.2 |
| Example 7 | 101.7 | 3820 | 96.0 |
| Example 8 | 100.9 | 4060 | 95.7 |
| Control Sample | 98.9 | 2200 | 92.2 |
| Standard Sample GP-1 | 100 | 3200 | 98.1 |

Table 1 indicates that along with the increase in the amount of $Al_2O_3$ added, both the brightness and specific surface of the phosphor are to different extents increased, and also is improved its thermal stability. The phosphate based green phosphor prepared in accordance with the composition and method of preparation of this invention indicated better brightness by 1–2% and larger specific surface by 200–300 cm²/g as compared with the Japanese sample GP-1.

EXAMPLES 9–14

In these examples, all samples were prepared in a way identical with Example 1, except that $ZrO_2$ was used in place of $Al_2O_3$, its amount being respectively 0.62 g, 1.11 g, 1.60 g, 2.09 g, 2.58 g, 3.08 g. The samples of these examples are, therefore, represented by $(La_{0.50}Ce_{0.32}Tb_{0.18})PO_4 \cdot w\ ZrO_2$ where the respective w values are $1\times10^{-2}$, $1.8\times10^{-2}$, $2.6\times10^{-2}$, $3.4\times10^{-2}$, $4.2\times10^{-2}$, $5.0\times10^{-2}$. Measurement results for Examples 9–14 are tabulated in Table 2.

TABLE 2

| Results of Examples 9 to 14 | | | |
|---|---|---|---|
| Sample No. | Relative Brightness Br(%) | Specific Surface Sv(cm²/g) | Thermal Stability Br'(%) |
| Example 9 | 99.5 | 2380 | 94.6 |
| Example 10 | 101.6 | 2560 | 96.7 |
| Example 11 | 102.3 | 2600 | 96.8 |
| Example 12 | 99.5 | 2710 | 96.5 |
| Example 13 | 98.8 | 2830 | 96.0 |
| Example 14 | 96.5 | 2950 | 94.0 |
| Control Sample | 98.5 | 2180 | 92.0 |

Table 2 indicates that with the addition of $ZrO_2$, the phosphor brightness, thermal stability and specific surface of the phosphor are all to different extents increased.

EXAMPLES 15–21

In these examples, all samples were prepared in a way identical with Example 1, except that $B_2O_3$ was used in place of $Al_2O_3$, its amount being respectively 0.35 g, 0.63 g, 0.91 g, 1.18 g, 1.46 g, 1.74 g, 3.48 g. The samples of these examples are, therefore, as represented by $(La_{0.50}Ce_{0.32}Tb_{0.18})PO_4 \cdot w\ B_2O_3$ where the respective w values are $1\times10^{-2}$, $1.8\times10^{-2}$, $2.6\times10^{-2}$, $3.4\times10^{-2}$, $4.2\times10^{-2}$, $5.0\times10^{-2}$, $1\times10^{-1}$. Measurement results for Examples 15–21 are tabulated in Table 3.

TABLE 3

Results of Examples 15 to 21

| Sample No. | Relative Brightness Br(%) | Specific Surface Sv(cm²/g) | Thermal Stability Br'(%) |
| --- | --- | --- | --- |
| Example 15 | 102.1 | 2400 | 95.4 |
| Example 16 | 103.5 | 2700 | 96.2 |
| Example 17 | 104.5 | 3100 | 97.8 |
| Example 18 | 104.5 | 3200 | 98.5 |
| Example 19 | 104.6 | 3450 | 99.4 |
| Example 20 | 104.5 | 3800 | 97.8 |
| Example 21 | 103.2 | 4200 | 97.5 |
| Control Sample | 99.8 | 2320 | 94.5 |

Table 3 indicates that the relative brightness, thermal stability, and specific surface of the phosphor are all substantially improved by the addition of $B_2O_3$.

EXAMPLE 22

Identical with Example 1 except that the phosphor composition is represented by $(La_{0.50} Ce_{0.32} Tb_{0.18}) PO_4 \cdot 1 \times 10^{-2} In_2O_3$.

EXAMPLE 23

Identical with Example 1 except that the phosphor composition is represented by $(La_{0.50} Ce_{0.32} Tb_{0.18}) PO_4 \cdot 1 \times 10^{-2} Nb_2O_5$.

EXAMPLE 24

Identical with Example 1 except that the phosphor composition is represented by $(La_{0.50} Ce_{0.32} Tb_{0.18}) PO_4 \cdot 1 \times 10^{-2} TiO_2$ Measurement results for Examples 22 to 24 are tabulated in Table 4.

TABLE 4

Results of Examples 22 to 24

| Sample No. | Relative Brightness Br(%) | Specific Surface Sv(cm²/g) | Thermal Stability Br'(%) |
| --- | --- | --- | --- |
| Example 22 | 102.1 | 3400 | 98.5 |
| Example 23 | 101.3 | 3340 | 98.2 |
| Example 24 | 101.1 | 3300 | 98.0 |
| Control Sample | 99.5 | 2400 | 95.2 |

Table 4 indicates that the addition of $In_2O_3$, $Nb_2O_5$, and $TiO_2$ brings about some improvement on the brightness, thermal stability, and specific surface of the phosphor.

EXAMPLE 25

Identical with Example 6 except that further addition of $B_2O_3$ was made. Thus, the phosphor composition is represented by $(La_{0.50} Ce_{0.32} Tb_{0.18}) PO_4 \cdot 5 \times 10^{-2} Al_2O_3 \cdot 5 \times 10^{-2} B_2O_3$.

Measurement results are given in Table 5 which indicates that simultaneous addition of both $Al_2O_3$ and $B_2O_3$ is beneficial in increasing the brightness, thermal stability, and specific surface of the phosphor.

TABLE 5

Results of Examples 25

| Sample No. | Relative Brightness Br(%) | Specific Surface Sv(cm²/g) | Thermal Stability Br'(%) |
| --- | --- | --- | --- |
| EXAMPLE 25 | 104.2 | 4150 | 99.5 |
| Example 6 | 104.4 | 3520 | 99.2 |
| Control Sample | 98.9 | 2200 | 92.2 |

Beneficial effects of this invention is quite obvious. Comparing with similar products of advanced quality in international market, the phosphor prepared in accordance with this invention manifests superior brightness by 2% or above, superior thermal stability by 1% or above, and larger specific surface by 500 cm²/g or more.

We claim:

1. A novel rare earth phosphate based green phosphor with a composition represented by $$(Ln_{1-x-y} Ce_x Tb_y) PO_4 \cdot wM$$

where Ln is one or more elements selected from the group consisting of La, Y, and Gd; M is one or more oxides of the elements selected from the group consisting of Zr, Nb and Ti; and $0.05 \leq x \leq 0.7$, $0.05 \leq y \leq 0.40$, $0.01 \leq w \leq 0.1$.

2. The green phosphor of claim 1 wherein said oxide is zirconium dioxide.

3. The green phosphor of claim 1 wherein said oxide is niobium pentoxide.

4. The green phosphor of claim 1 wherein said oxide is titanium dioxide.

* * * * *